June 21, 1927. 1,633,441
A. T. FIRTH
SHEARS OR SCISSORS AND THE LIKE
Filed Jan. 29, 1926
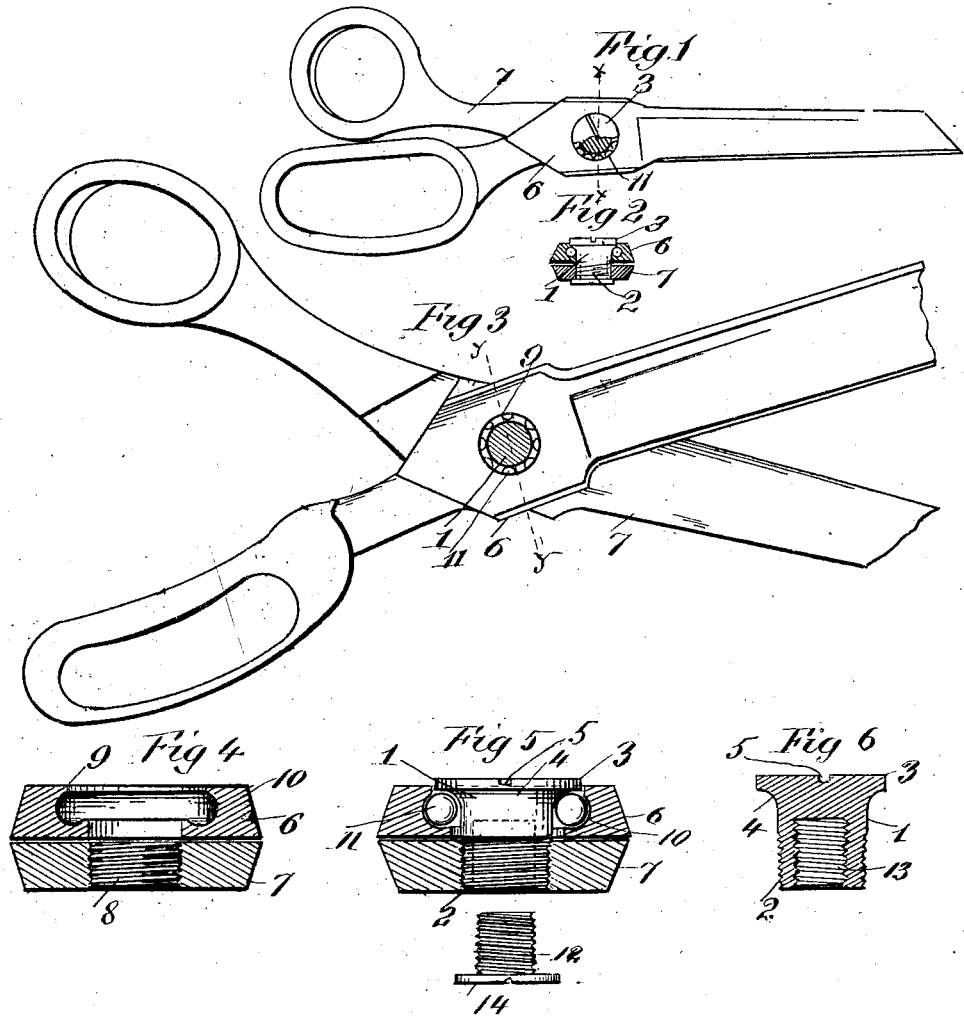

Patented June 21, 1927.

1,633,441

UNITED STATES PATENT OFFICE.

ALFRED T. FIRTH, OF NEW YORK, N. Y.

SHEARS OR SCISSORS AND THE LIKE.

Application filed January 29, 1926. Serial No. 84,677.

This invention has relation to certain improvements in shears and scissors, and has for its object the provision of means for reducing the friction at the pivotal centre and overcoming the strain and wear which occurs chiefly at the pivotal point of shears of ordinary construction.

Usually the blades of scissors or shears are connected by an unsubstantial pivot consisting of a machine screw the threaded shank of which is so tightly fitted into one of the members as to render any adjustment practically impossible.

In both the head and shank of such screw the wearing surface is small and inadequate to sustain the heavy strain to which the implement is subjected. This is particularly the case with large shears, such as are used for cutting metal, and by tailors in cutting heavy cloth. Strain is put upon the narrow wearing surface of the head of the screw by the hand of the operator in an effort to keep the cutting edges of the blades in proper cutting relation.

In ordinary household use or by tailors or cloth cutters the application of a lubricant would result in damage to the material being cut, and is therefore impracticable.

A grinding friction therefore takes place on the narrow marginal surface of the pivot head, which results in a looseness and a gradual spreading apart of the blades which must therefore be forcibly tipped toward their cutting edge to be effective.

This action results in causing the screw head to wear on one side more than on the other. This causes deterioration of the cutting edges and of the pivot, and renders the use of the implement laborious and annoying.

Other defects and disadvantages are well known and need not be stated.

My improvement consists in the novel feature of construction and arrangement hereinafter particularly described and claimed involving essentially the use of anti-friction balls in connection with novel seating means and pivotal adaptation, whereby the friction is reduced to a minimum, undue wear avoided and the adjustment of the parts, when necessary rendered easy and within the skill of the ordinary user.

In the accompanying drawings:

Fig. 1 is a side or face view of a pair of ordinary household scissors or shears embodying my improvements.

Fig. 2 is a section on line X—X of Fig. 1.

Fig. 3 is a view, similar to Fig. 1, of a larger size pair of shears.

Fig. 4 is a transverse sectional view of a paid of shear blades on line Y—Y of Fig. 3, with the pivot and bearing balls omitted.

Fig. 5 is a view similar to Fig. 3, but with the pivot and balls in place, and set screw displaced.

Fig. 6 is a central sectional view of the pivot connecting the blades.

The pivot or pintle, which forms an essential part of my invention is in the form of a bolt, composed of a shank screw-threaded about half its length, as shown at 2, and provided with a head 3, which is formed with a concave undercut portion 4, which merges into the unthreaded portion of the shank 1; the head 3 is notched across its face as shown at 5, for the application of a screw-driver to adjust the pivot. The pivot head is of cylindrical fillister form with a comparatively deep, peripheral, portion, which allows it to seat within the correspondingly cylindrical and concentric mouth of the ball holding blade member and rest on the balls below the outer surface of the blade.

6 and 7 designate the blade members of the shears or scissors of which 6 may be termed the upper or right hand member, and 7 the lower or left hand member, the latter being formed with a screw threaded hole 8 for the passage and retention of the threaded portion of the pivot which is passed through an opening 9 in the member 6 and firmly screwed to the member 7, so that the member 6 may rotate around the pivot.

The wall of the opening 9 is formed with an annular grooved bearing, 10, and has seated therein the anti-friction balls 11. The blade member 6 is formed with an annular grooved portion constituting a seat or race for the anti-friction balls a sufficient depth below the blade surface to accommodate balls with their upper or outer portions situated at an appreciable distance from the blade surface to provide a cylindrical recess bore or socket for the reception of the pivot head, such recess constituting a mouth or throat for the insertion of the balls. By providing in this way for positioning the pivot head within and embraced by the wall of this socket or bore, the top of the pivot head is brought close enough to the blade surface, to avoid unsightly and inconvenient projection beyond the latter.

When the pivot is inserted through the member 6, its undercut portion 4, contacts with these balls, and the latter thereby constitute an efficient anti-friction bearing between the blade members, 6, and the pivot; and as these parts co-operate in the well known manner of ball bearings, the movements of the blades in the act of cutting are wholly without strain or binding. Whatever wear may occur in the concave portions 4, of the pivot 1, and the groove 10, will be compensated for by the adjustment of the pivot.

In order to retain the pivot at the desired point of adjustment and to prevent any looseness in the connection which might interfere with the efficiency of the implement, I provide adequate means for locking the pivot at any position.

For this purpose I form the shank of the pivot with an axially screw-threaded bore or socket 13, to receive a headed set-screw 12.

The external screw threads of the pivot and the threads of the set screw 12, run in opposite directions, one being a right hand and the other a left hand screw, so that any tendency of the pivot to either loosen or tighten, will be opposed by the set-screw, which thus acts as a nut lock.

The proper adjustment of the blades is obtained by screwing the pivot into the blade members 7, so as to bring the two blades as closely together as may be desired; and then inserting and tightening up the set-screw 12, until its head impinges against the blade member 7. By loosening the set-screw, the pivot may be adjusted to compensate for wear and loosening of the parts. It will be understood that the shank of the pivot does not extend entirely through the blade member 7, a slight margin of space being left between its end and the head of set-screw to permit the latter to contact with the surface of the blade member, and avoid being tightened up against the end of the pivot.

I claim:

1. In a cutting implement of the type described, a pair of pivotally connected shear members having cutting blades, one of which is formed with an annular bearing groove in the wall of the pivot hole, in which are situated anti-friction balls, and the other formed with a screw threaded pivot hole in which is secured a headed pivot formed with a bearing portion with which the anti-friction balls contact, said pivot head being of fillister form, and said bearing groove formed with a cylindrical socket extension of appreciable depth, into which the pivot head fits with its under surface in contact with the balls.

2. A cutting implement of the shear type, comprising a pair of pivotally connected shear members and a connecting pivot, one of said members having an undercut ball race in the wall of its pivot hole, with a cylindrical extension forming a socket for the pivot head, and the other a threaded pivot hole in which is adjustably seated the pivot, and anti-friction balls seated in said ball race and in bearing contact with the pivot head and shank, below the surface of the shear member, said pivot being of cylindrical fillister form, and fitting with said socket below the blade surface.

In testimony whereof I affix my signature.

ALFRED T. FIRTH.